United States Patent
Koskan et al.

(10) Patent No.: US 9,959,744 B2
(45) Date of Patent: May 1, 2018

(54) METHOD AND SYSTEM FOR PROVIDING ALERTS FOR RADIO COMMUNICATIONS

(71) Applicant: MOTOROLA SOLUTIONS, INC, Schaumburg, IL (US)

(72) Inventors: Patrick D. Koskan, Lake Worth, FL (US); Barbara Millet, Hollywood, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 269 days.

(21) Appl. No.: 14/262,015

(22) Filed: Apr. 25, 2014

(65) Prior Publication Data

US 2015/0310725 A1    Oct. 29, 2015

(51) Int. Cl.
| | |
|---|---|
| G08B 23/00 | (2006.01) |
| G06F 3/16 | (2006.01) |
| G10L 15/02 | (2006.01) |
| H04H 20/59 | (2008.01) |
| G10L 25/51 | (2013.01) |
| G10L 15/00 | (2013.01) |
| H04H 60/37 | (2008.01) |
| H04H 60/48 | (2008.01) |
| H04H 60/51 | (2008.01) |
| G10L 15/08 | (2006.01) |
| H04W 4/18 | (2009.01) |
| H04W 4/22 | (2009.01) |

(52) U.S. Cl.
CPC ............. *G08B 23/00* (2013.01); *G06F 3/165* (2013.01); *G10L 15/00* (2013.01); *G10L 15/02* (2013.01); *G10L 25/51* (2013.01); *H04H 20/59* (2013.01); *H04H 60/37* (2013.01); *H04H 60/48* (2013.01); *H04H 60/51* (2013.01); *G10L 2015/088* (2013.01); *H04W 4/18* (2013.01); *H04W 4/22* (2013.01)

(58) Field of Classification Search
CPC .................. G08B 23/00; G06F 3/165
USPC .......................................................... 704/274
See application file for complete search history.

(56) References Cited

U.S. PATENT DOCUMENTS

| | | | | |
|---|---|---|---|---|
| 6,011,854 A | | 1/2000 | Van Ryzin | |
| 6,332,120 B1 * | | 12/2001 | Warren | G10L 15/26 |
| | | | | 704/235 |

(Continued)

FOREIGN PATENT DOCUMENTS

| | | | | |
|---|---|---|---|---|
| WO | WO 0145386 A2 * | 6/2001 | ............. | G08B 21/10 |
| WO | 2013136118 A1 | 9/2013 | | |

(Continued)

OTHER PUBLICATIONS

PCT International Search Report dated Jun. 24, 2015 for Counterpart Application PCT/US2015/026148.

(Continued)

*Primary Examiner* — Daniel C Washburn
*Assistant Examiner* — Oluwadamilola M Ogunbiyi

(57) ABSTRACT

A method and system for providing alerts for radio communications are provided. One or more keywords are generated based on one or more contextual parameters associated with a radio device. An audio stream is received at the radio device from a radio transmitter. One or more of the one or more keywords are detected in the audio stream, and an alert for the audio stream is provided to a user of the radio device.

16 Claims, 5 Drawing Sheets

(56) References Cited

U.S. PATENT DOCUMENTS

| | | |
|---|---|---|
| 7,391,877 B1 | 6/2008 | Brungart |
| 7,672,845 B2 | 3/2010 | Beranek et al. |
| 8,521,680 B2 | 8/2013 | Lin |
| 8,537,983 B1 | 9/2013 | Haggerty et al. |
| 8,676,904 B2 | 3/2014 | Lindahl |
| 9,215,194 B2* | 12/2015 | Shaffer ............... G06Q 10/107 |
| 2004/0019499 A1* | 1/2004 | Murashita ......... G06F 17/30864 705/1.1 |
| 2006/0126859 A1 | 6/2006 | Elberling |
| 2006/0164926 A1* | 7/2006 | Morgan ................ H04H 40/18 369/6 |
| 2009/0042546 A1* | 2/2009 | McClendon ......... G08B 27/006 455/414.1 |
| 2010/0070448 A1* | 3/2010 | Omoigui ............ H01L 27/1463 706/47 |
| 2011/0095881 A1* | 4/2011 | Rosentel ............. G08B 27/008 340/501 |
| 2011/0115644 A1* | 5/2011 | Grotendorst ......... G08G 1/0965 340/903 |
| 2011/0237287 A1* | 9/2011 | Klein ................ H04M 3/42178 455/521 |
| 2011/0276326 A1* | 11/2011 | Fumarolo ......... H04M 3/42187 704/235 |
| 2012/0030682 A1* | 2/2012 | Shaffer ............... H04L 65/1076 718/103 |
| 2012/0143673 A1* | 6/2012 | Law ....................... G06Q 30/02 705/14.42 |
| 2012/0296865 A1* | 11/2012 | Lin ..................... G06F 17/2735 707/609 |
| 2013/0054512 A1* | 2/2013 | Ephrat ................. G06F 19/325 707/602 |
| 2013/0080177 A1 | 3/2013 | Chen |
| 2013/0301813 A1 | 11/2013 | Shaffer et al. |
| 2014/0025379 A1 | 1/2014 | Ganapathiraju et al. |
| 2014/0099910 A1* | 4/2014 | Corretjer ................ H04L 69/14 455/404.1 |
| 2014/0100891 A1* | 4/2014 | Turner .................. G06Q 40/08 705/4 |
| 2014/0114992 A1* | 4/2014 | Buford ............. G06F 17/30943 707/755 |
| 2014/0199051 A1* | 7/2014 | Engeli ................ H04N 21/4147 386/296 |
| 2014/0200903 A1* | 7/2014 | Hancock ................ G06Q 50/22 705/2 |
| 2014/0282704 A1* | 9/2014 | Tumuluru .......... H04N 21/4882 725/33 |
| 2014/0301556 A1* | 10/2014 | Wang ...................... H03G 9/00 381/57 |
| 2015/0147990 A1 | 5/2015 | Kreitzer et al. |

FOREIGN PATENT DOCUMENTS

| | | |
|---|---|---|
| WO | 2014041477 A1 | 3/2014 |
| WO | 2014190508 | 12/2014 |

OTHER PUBLICATIONS

Pavel Sovka et al—"Speech Enhancement With Applications to Speech Tranbsmission and Speech Recognition"—MCM Meeting COST249, Zurich, Switzerland—Oct. 1996.

Peter Sou-Kong Chang—A Thesis—"Exploration of Behavioral, Physiological, and Computational Approaches to Auditory Scene Analysis"—Graduate School of the Ohio State University—2004.

* cited by examiner

METHOD AND SYSTEM FOR PROVIDING ALERTS FOR RADIO COMMUNICATIONS

BACKGROUND OF THE INVENTION

Radio users, for example, in a public safety communication system, commonly receive audio messages from radio communications that are broadcast to other users, but which are not necessarily relevant to all users or to a particular user. Large numbers of such audio messages can sometimes inundate a user and lead the user to "tune out" the audio messages and miss important information.

Further, audio messages from multiple radio communications can sometimes overlap, and other competing audio, such as background noise, a car stereo or a conversation can be present in a user's environment. The user may therefore struggle to identify important audio messages among the overlapping messages, or struggle to hear important audio messages over competing audio from their environment.

A user, such as a Public Services Officer, will often manually turn a radio volume down to prevent a distraction from other tasks. The user will then often turn the volume up when he or she thinks they have heard something important, for example, a call sign, a name or a familiar voice. However, such an approach is manually intensive and may increase a likelihood that a user will miss important radio communications.

Accordingly, there is a need for an improved method and system for providing alerts for radio communications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
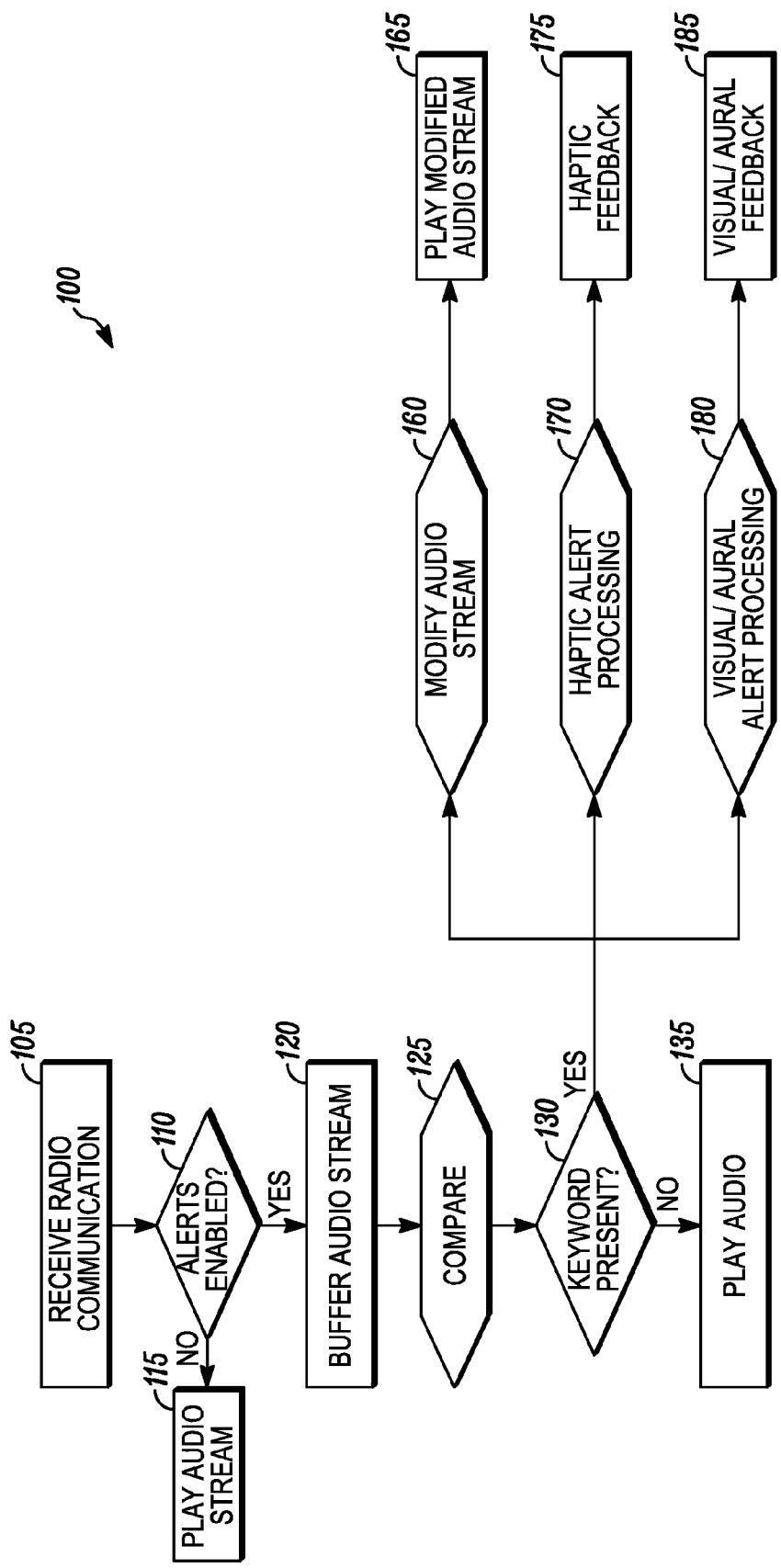
FIG. 1 is a flow diagram of a method performed at a radio device to provide alerts for radio communications in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to certain embodiments, the present invention resides in a method of providing alerts for radio communications comprising the following steps. One or more keywords are generated based on one or more contextual parameters associated with a radio device. An audio stream is received at the radio device via radio communications. Next, one or more of the one or more keywords are detected in the audio stream. An alert for the audio stream is then provided to a user of the radio device.

According to some embodiments, a radio device receives and/or stores one or more contextual parameters. The one or more contextual parameters can include contextual parameters associated with the radio device, such as any of the following: the user of the radio device; the role of the user of the radio device; an assignment of the user of the radio device; a location of the radio device or the user of the radio device; an equipment of the user of the radio device; a group affiliation of the user of the radio device; an expertise of the user of the radio device, or another radio device that is associated with the radio device, for example, a radio device of another user in the same group as the user of the radio device; a user of the other radio device; and/or a context associated with any of the preceding contextual parameters, such as a context associated with the other radio device or the user of the other radio device.

According to some embodiments, the one or more contextual parameters are dynamic and are updated in real-time. In some embodiments, one or more of the one or more contextual parameters are determined by context aware technologies in, or in communication with, the radio device. For example, a location of the radio device can be determined from a Global Positioning System (GPS), Wifi, beacons, sensors, or proximity technologies. In some embodiments, one or more of the one or more contextual parameters can be entered manually by the user.

FIG. 1 is a flow diagram of a method 100 performed at a radio device, such as a radio receiver, in accordance with some embodiments. In some embodiments, the radio device is a "dual watch" radio device, in which multiple channels can be monitored simultaneously at any one time, for example, through a single speaker. The method 100 comprises the following steps.

At step 105, a radio communication including an audio stream is received at a radio device. The radio communication is then decoded, if necessary.

At step 110, a check is performed to determine whether alerts, for example, for important audio messages, are enabled on the radio device. If alerts are not enabled, the method proceeds to step 115 where the audio stream is played by the radio device. If alerts are enabled the method proceeds to step 120 where the audio stream is buffered by the radio device. In some embodiments, an alerts setting can be overridden based on one or more contextual parameters. For example, a dynamic context associated with the user of the radio device, such as an incident relating to the role of the user of the radio device, could enable alerts automatically. For example, the user of the radio device may be a police officer, and the police officer is assigned to an incident, and the radio device automatically enables alerts, so the police officer does not miss important audio relating to the incident.

At step 125, the audio steam is compared with one or more keywords. According to some embodiments, the comparison is made by dynamically generating audio of each of the one or more keywords and comparing the audio of each of the one or more keywords with the audio stream. However, in alternative embodiments, the audio stream can be compared with the one or more keywords via other techniques, for example, converting the audio stream to text via speech to text and then comparing the text with the one or more keywords.

At step 130, if a keyword is detected, the method proceeds to one or more of steps 160, 170 and 180 to provide an alert to the user. The alert can then prompt the user to focus their attention on the audio stream.

For example, at step 160, an alert is provided for the audio stream by modifying all or part of the audio stream to create a modified audio stream. Modifying all or part of the audio stream can comprise one or more of the following: increasing a volume of all or part of the audio stream; applying a frequency shift to all or part of the audio stream; and adding one or more sound effects to the audio stream, such as, dynamic filtering, spectral shaping, volume levelling, a beep, distortion, equalization, modulation, reverb, delay, and the like.

Modifying all or part of the audio stream can enable the user to more easily distinguish or more clearly understand an important audio stream among a plurality of audio streams that are played simultaneously. At step 165, the modified audio stream is then played by the radio device.

At steps 170 and 180, an alert is provided on the radio device, or an associated device, before or during play of the audio stream. For example, the associated device can be an accessory worn by the user, such as glasses, a watch, a phone, a belt, or a vest; alternatively the associated device can be part of a vehicle in contact with the user, such as a seat, a steering wheel or a user interface associated with the vehicle, for example, a heads up display, dash board lights, an entertainment center, a horn, headlights, door chimes or reminder tones.

For example, at step 170, haptic feedback is synchronized with the playing of the audio stream. At step 175, the haptic feedback is then generated on the radio device, or the associated device, before or during play of the audio stream to alert the user. The haptic feedback can be, for example, a vibration, a tapping, or a compression, such as, a compression of the vest of the user.

As yet another example, at step 180, visual and/or aural feedback is synchronized with the playing of the audio stream. At step 185, the visual and/or aural feedback is then generated on the radio device, or the associated device, before or during play of the audio stream. The visual feedback can be, for example, a light, such as a light emitting diode (LED) or a strobe light, or a dashboard indicator in a vehicle. Alternatively the visual feedback can be, for example, an output on a display. Where the visual feedback is a light, the light can be color coded to indicate the nature of the alert or a priority of the alert. The aural feedback can be, for example, an audio effect, such as, an alarm or a beep.

In some embodiments, the alert can be configured based on one or more contextual parameters, such as, one or more of the one or more contextual parameters or one or more other contextual parameters. For example, the volume and/or frequency shift can be based on a hearing frequency response of the user, or the alert can be chosen based on the amount of noise in the surrounding environment in real time. For example, the alert can be configured to be an automatic increase of volume in a loud environment and provide a haptic or visual indication in a quiet environment where raising volume is discouraged, such as a courthouse.

At step 130, if no keyword is detected, the method 100 proceeds to step 135 where the audio stream is played by the radio device. In some embodiments, all or part of the audio stream is modified prior to playing the audio stream, for example, to mask all or part of the audio stream. In such a way, an alert is provided to one of a plurality of audio streams received at the radio device by modifying all or part of one or more other audio streams played on the radio device, instead of, or as well as, modifying the one of the plurality of audio streams. For example, all or part of the one or more other audio streams can be modified in the following ways: by decreasing a volume of all or part of the one or more other audio streams; applying a frequency shift to all or part of the one or more other audio streams; distorting all or part of the one or more other audio streams; filtering all or part of the one or more other audio streams; shaping all or part of the one or more other audio streams; levelling all or part of the one or more other audio streams; and muting all or part of the one or more other audio streams. As examples, filtering can include dynamic filtering, shaping can include spectral shaping, and levelling can include volume levelling.

Modifying all or part of the one or more other audio streams can enable the user to more easily distinguish, or more clearly understand, the one of the plurality of audio streams, especially when the plurality of audio streams are played simultaneously.

In some embodiments, the modifications to the audio stream and/or the one or more other audio streams are based on the one or more contextual parameters. For example, an optimal modification is determined based on the dynamic context of the user or their current environment.

The one or more keywords can be generated based on the one or more contextual parameters. In preferred embodiments, the one or more keywords are generated based on the one or more contextual parameters dynamically in real time. In some embodiments, a keyword database is read and the one or more keywords are generated based on the keyword database. For example, the keyword database can be a dynamic database and the keywords in the keyword database can be updated in real time based on the one or more contextual parameters as the one or more contextual parameters change. In some embodiments, the keyword database identifies associations between keywords and contextual parameters and the one or more keywords are generated based on the one or more contextual parameters and these associations. The keyword database can be maintained and stored locally on the radio device and/or can be accessed from a remote device where the keyword database is maintained. In some embodiments, a local keyword database on the radio device is synchronized with a remote keyword database on a remote device, for example, via radio communications, cabled communications or another communication means. The one or more keywords can be keywords determined to be relevant or important to the user.

In some embodiments, if one or more keywords are detected in a plurality of audio streams on the radio device, each of the plurality of audio streams will be given a priority and will be modified accordingly. For example, the priority can be determined from a priority assigned to each of the one or more contextual parameters and/or each of the one or more keywords or a combination thereof.

According to certain embodiments, the present invention resides in a method of providing alerts for radio communications comprising the following steps. One or more keywords are generated based on one or more contextual parameters associated with a radio receiver. An audio stream to be transmitted to the radio receiver is read at a radio transmitter. One or more of the one or more keywords are then detected in the audio stream. The audio stream is then transmitted to the radio receiver with one or more modifications or additions for providing an alert for the audio stream to a user of the radio receiver.

Figure 2:
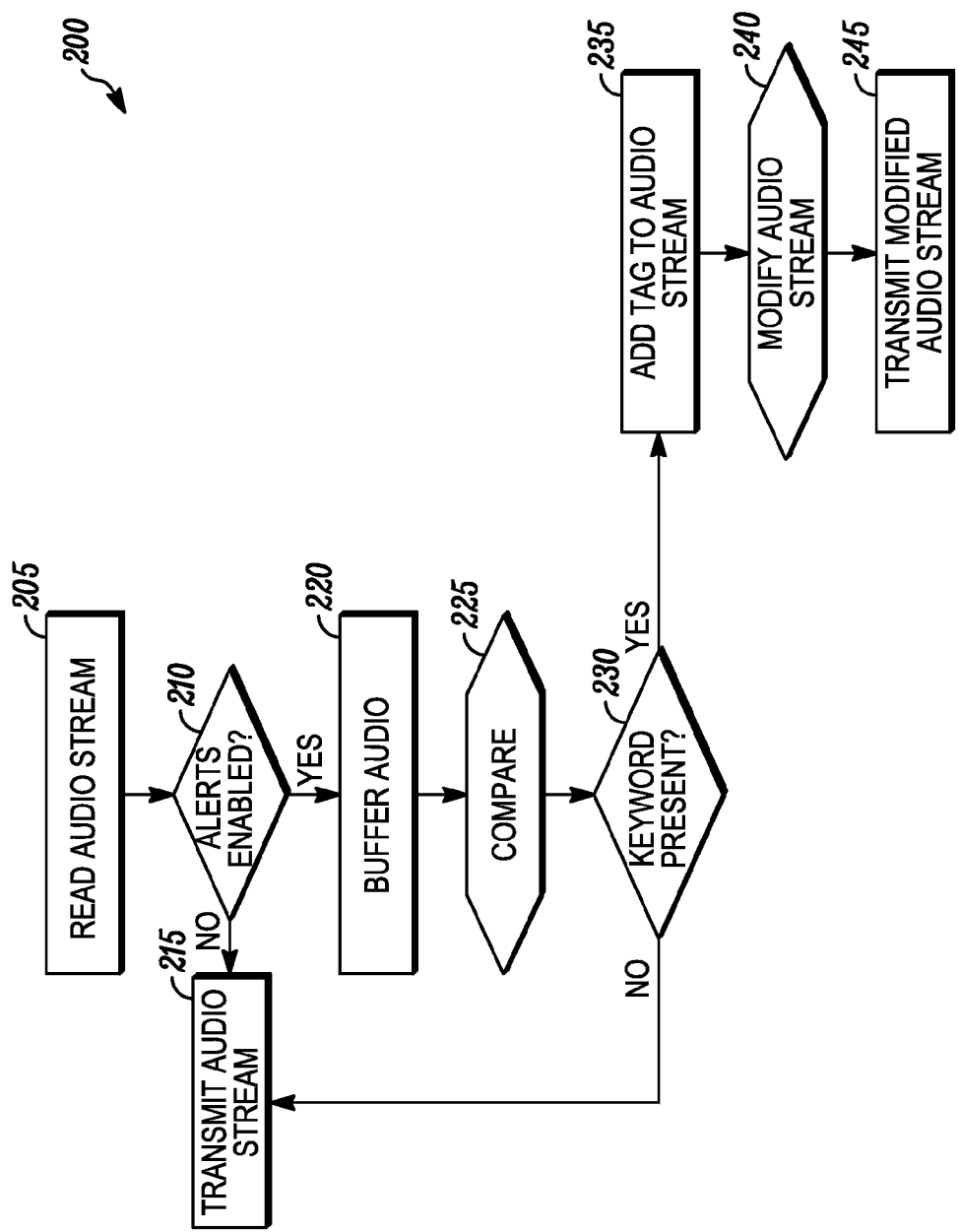
FIG. 2 is a flow diagram of a method performed at a radio transmitter to provide alerts for radio communications at a radio receiver, in accordance with some embodiments.

FIG. 2 is a flow diagram of a method 200 performed at a radio transmitter to provide alerts for radio communications at a radio receiver, in accordance with some embodiments. In preferred environments, the radio transmitter receives and/or stores one or more contextual parameters, for example, the one or more contextual parameters described in relation to FIG. 1. The method 200 comprises the following steps.

At step 205, an audio stream is read at a radio transmitter. The audio stream is to be transmitted to a radio receiver. In some embodiments, the audio stream is received by the radio transmitter and relayed to the radio receiver. For example, the radio transmitter is a repeater and receives the audio stream from another radio transmitter. In some embodiments, the audio stream is input to the radio transmitter, for example, via a microphone, a computer or another device.

At step 210, a check is performed to determine whether alerts are enabled for the radio receiver. If alerts are not enabled, the method proceeds to step 215 where the audio stream is transmitted to the radio receiver. If alerts are enabled, the method proceeds to step 220 where the audio stream is buffered. In some embodiments, the alerts setting can be overridden based on one or more contextual parameters. For example, a dynamic context associated with the user of the radio device, such as an incident relating to the role of the user of the radio device, can enable alerts automatically.

At step 225, the audio steam is compared with one or more keywords. In some embodiments, the comparison is made by dynamically generating audio of each of the one or more keywords and then comparing the audio of each of the one or more keywords with the audio stream. However, in alternative embodiments, the audio stream can be compared with the one or more keywords via other techniques, for example, converting the audio stream to text via speech to text and then comparing the text with the one or more keywords.

The one or more keywords can be generated based on the one or more contextual parameters. In preferred embodiments, the one or more keywords are generated dynamically in real time based on the one or more contextual parameters. In some embodiments, a keyword database is read and the one or more keywords are generated based on the keyword database. For example, the keyword database can be a dynamic database and the keywords in the keyword database can be updated in real time based on the one or more contextual parameters as the one or more contextual parameters change. In some embodiments, the keyword database identifies associations between keywords and contextual parameters and the one or more keywords are generated based on the one or more contextual parameters and these associations. The keyword database can be maintained and stored locally on the radio transmitter and/or can be accessed from a remote device, such as the radio device of the method 100 or a base station, where the keyword database is maintained. In some embodiments, a local keyword database on the radio transmitter is synchronized with a remote keyword database on a remote device, for example via radio communications, cabled communications or another communication means. The one or more keywords can be keywords determined to be relevant or important to the user.

At step 230, if no keyword is detected, the method proceeds to step 215 where the audio stream is transmitted the radio receiver. At step 230, if one or more of the one or more keywords are detected, the method proceeds to steps 235 and 240, where one or more modifications or additions are made to the audio stream for providing an alert for the audio stream to the user of the radio receiver. At step 245, the audio stream is then transmitted to the radio receiver with the one or more modifications or additions.

In some embodiments, at step 230, a priority can be assigned to the audio stream based on the one or more of the one or more keywords or the associated contextual parameters. A priority can also be assigned manually to the audio stream. In some embodiments, the modifications or additions made at steps 235 and 240 are based on the priority or include the priority.

In some embodiments, at step 235, a tag is added to the audio stream to instruct the radio receiver to provide one or both of an alert and a priority for the audio stream. The tag can be transmitted with or as part of the audio stream at step 245 to instruct the radio receiver to provide one or both of an alert and a priority for the audio stream. In some embodiments, the tag includes the priority.

In some embodiments, at step 240, an alert is provided by modifying all or part of the audio stream to create a modified audio stream. For example, all or part of the audio stream is modified by increasing a volume of all or part of the audio stream, applying a frequency shift to all or part of the audio stream, and/or adding one or more sound effects to the audio stream. In some embodiments, the modification or addition can be configured based on one or more contextual parameters, such as one or more of the one or more contextual parameters or on one or more other contextual parameters, as in step 160 of method 100.

Figure 3:
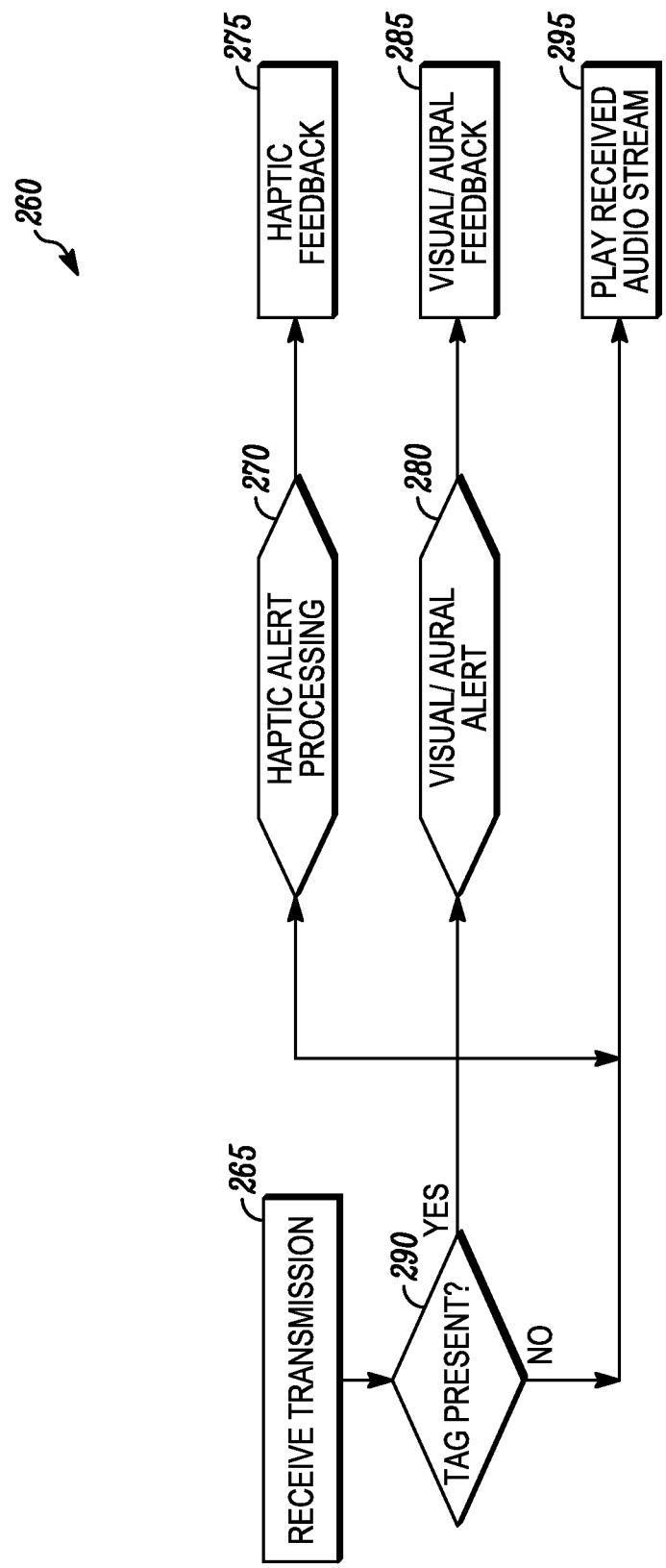
FIG. 3 is a flow diagram of a method performed at a radio receiver in conjunction with the method shown in FIG. 2, in accordance with some embodiments.

FIG. 3 is a flow diagram of a method 260 performed at a radio receiver in conjunction with the method shown in FIG. 2, in accordance with some embodiments. For example, the method 260 can be provided in the radio receiver of method 100. The method 260 comprises the following steps.

At step 265, a radio communication including an audio stream is received at the radio receiver. The radio communication is decoded, if necessary.

At step 267, a check is performed to determine whether the radio communication includes a tag. If a tag is not present, the method proceeds to step 295 where the audio stream is played by the radio receiver. If a tag is present, the method proceeds to one or both of steps 270 and 280 to provide an alert on the radio receiver, or an associated device, before or during play of the audio stream at step 290. For example, the associated device can be an accessory worn by the user, such as glasses, a watch, a phone, a belt, or a vest; or part of a vehicle in contact with the user, such as a seat, a steering wheel or a user interface associated with the vehicle, for example a heads up display, dash board lights, an entertainment center, a horn, headlights, door chimes or reminder tones.

At step 270, haptic feedback is synchronized with the playing of the audio stream at step 295. At step 275, the haptic feedback is then generated on the radio receiver, or the associated device, before or during play of the audio stream to alert the user. The haptic feedback can be, for example, a vibration, a tapping, or a compression, such as, a compression of the vest of the user.

At step 280, visual and/or aural feedback is synchronized with the playing of the audio stream at step 295. At step 285, the visual and/or aural feedback is then generated on the radio receiver, or the associated device, before or during play of the audio stream. The visual feedback can be, for example, a light, such as, an LED, a strobe, or a dashboard indicator in a vehicle, or the visual feedback can be, for example, an output on a display. Where the visual feedback is a light, the light can be color coded to indicate the nature of the alert or a priority of the alert. The aural feedback can be, for example, an audio effect, such as, an alarm or a beep.

The method 260 can additionally include other features of the method 100. For example, the method 260 can include a check to determine whether alerts are enabled on the radio receiver and/or modifying all or part of the audio stream or one or more other audio streams played on the radio receiver to provide an alert. For example, if a plurality of audio streams is played simultaneously on the radio receiver, the radio receiver can modify all or part of one or more of the plurality of audio streams to highlight or mask all or part of the audio streams based on their priority.

According to certain embodiments, the present invention resides in a system for providing alerts for radio communications. The system comprises a radio transmitter to transmit an audio stream and a radio receiver to receive the audio stream. The system further comprises a processor, in the radio transmitter or the radio receiver and a memory coupled to the processor.

Figure 4:
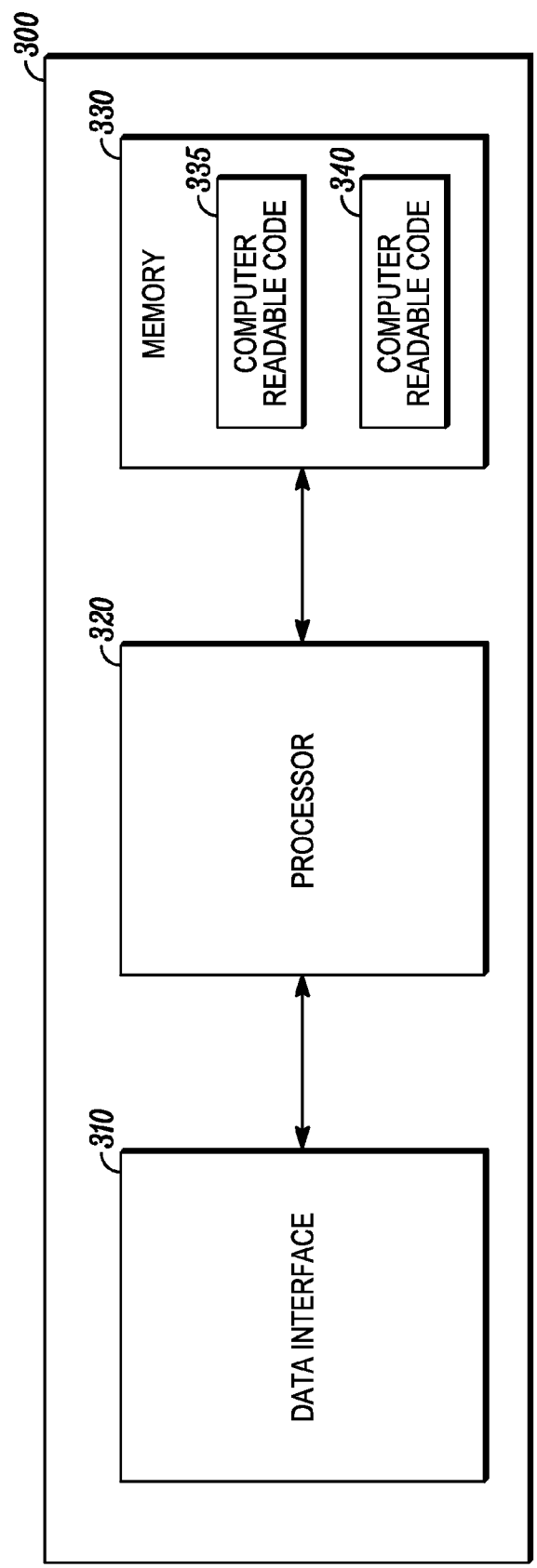
FIG. 4 is a schematic of a device, such as a radio transmitter or receiver, in accordance with some embodiments.
Figure 5:
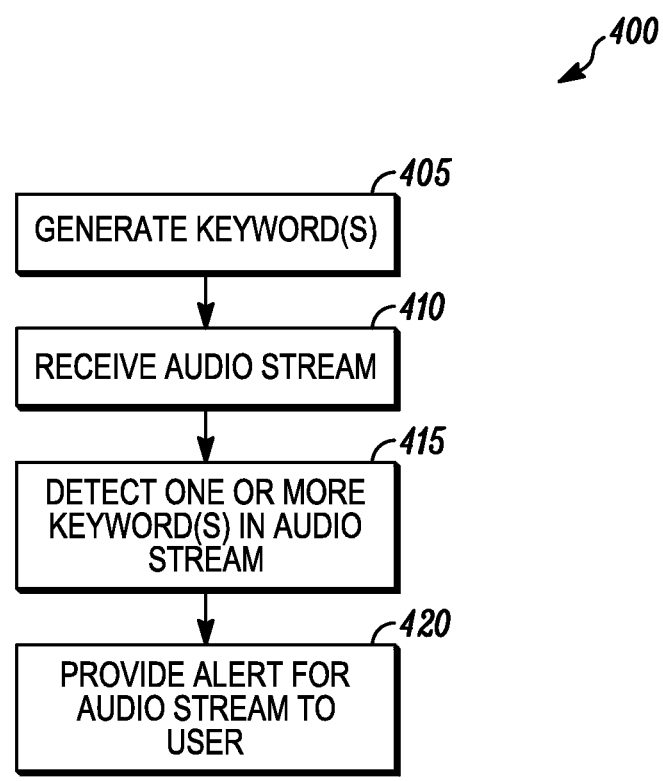
FIG. 5 is a flow diagram illustrating a method of providing alerts for radio communications, in accordance with some embodiments.

FIG. 4 is a schematic of a device 300 in accordance with some embodiments. The device 300 can be the radio transmitter or the radio receiver referred to above. The device 300 comprises a processor 320 and a memory 330 coupled to the processor 320. The memory 330 includes instruction code 335 for executing the following: generating one or more keywords based on one or more contextual parameters associated with the radio receiver; reading an audio stream; detecting one or more of the one or more keywords in the audio stream; and providing an alert for the audio stream to a user of the radio receiver. In some embodiments, the memory 330 comprises instruction code for performing one or more of the steps of method 100, method 200, or method 260.

The processor 320 processes the computer readable program code components stored in the memory 330 and implements various methods and functions of the radio receiver 100, as described herein.

The memory 330 includes a data store 340. The data store 340 includes data such as the one or more contextual parameters and the keyword database identifying associations between keywords and contextual parameters. As will be understood by a person skilled in the art, a single memory, such as the memory 330, can be used to store both dynamic and static data.

The structure of the memory 330 is well known to those skilled in the art and can include a basic input/output system (BIOS) stored in a read only memory (ROM) and one or more program modules such as operating systems, application programs and program data stored in random access memory (RAM).

One or more interfaces 310 are coupled to the processor 320. The one or more interfaces 310 include, for example, an antenna to transmit or receive one or more radio communications, and one or more other communications devices for receiving, for example, the one or more contextual parameters. In some embodiments, where the device is a radio receiver, the one or more contextual parameters are received at the radio receiver from one or more associated devices. In some embodiments, where the device is a radio transmitter, radio communications are received at an antenna of the device 300 for transmission from the same or a different antenna of the device 300.

FIG. 4 is a flow diagram illustrating a method 400 of providing alerts for radio communications, according to some embodiments.

At block 405, one or more keywords are generated based on one or more contextual parameters associated with the radio device. For example, if a user of the radio device is a police officer, one of the one or more keywords could be "shots fired", and another of the one or more keywords could relate to the police officer's current location.

At block 410, an audio stream is received at a radio device via radio communications. For example, the radio device can be the radio of a public services officer, such as a police officer, and the audio stream can be received from a radio transmitter, such as another radio device or a base station.

At block 415, one or more of the one or more keywords are detected in the audio stream. For example, the audio stream may contain the words "shots fired" and a location near the police officer's current location.

At block 420, an alert for the audio stream is provided to a user of the radio device. For example, the alert can identify to the police officer that the audio stream is important and/or highlight the one or more of the one or more keywords detected, so that the police officer does not miss them. This assists the police officer in noticing and hearing the audio stream among other less important audio streams.

The one or more contextual parameters referred to herein can include, for example, personal contextual parameters, vehicular contextual parameters, incident contextual parameters and/or environmental contextual parameters. The contextual parameters can be input to the radio device automatically or manually and the keyword database can be reconfigured automatically or manually. The contextual parameters can be detected by associated sensors, imaging, and audio technologies which are then automatically updated in the keyword database dynamically in real time.

Personal contextual parameters can include, for example, parameters related to the user, such as, a weapon used/discharged, an indoor/outdoor location of the user, a proximity to a dangerous entity, a fight, a personal pursuit/running, an automatic man-down, a weapon, handcuffs, or pepper spray drawn and/or an emergency button detection. Other personal contextual parameters related to the user can include: a job role, a job assignment, a group affiliation, an expertise, a gender, a religion, a color, a size, a biophysical status, an emotional status or a health of the user; whether the user is on or off duty; languages spoken or recognized by the user; and equipment and/or accessories associated with the user.

Vehicular contextual parameters can include, for example, parameters related to a vehicle associated with the radio device or the user, such as, a vehicular pursuit, a vehicle moving without a responder, an outdoor location of the vehicle, a door/trunk opened/closed with/without the user nearby, tampering with the vehicle, a dog released from the vehicle, the occupants of the vehicle, occupation of the passenger seat, the vehicle status, a weapon removed from the vehicle, proximity to other vehicles, proximity to landmarks and incidents of interest and/or accessories available on the vehicle.

Incident contextual parameters can include, for example, parameters related to an incident, such as, an incident threat level, an incident type, groups assigned to an incident and/or an incident threat level in a location.

Environmental contextual parameters can include, for example, parameters related to the surrounding environment, such as gun shot detection, explosive detection, radiation detection, toxic gas detection, glass break detection, aggression, person of interest nearby, building access control data, weather, environmental noise, a vehicle of interest nearby and/or an object of interest nearby.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing alerts for playback of received radio communications, the method comprising:

maintaining, by a radio device for playing back received audio streams to a user, a received audio stream playback alert keyword database of one or more first keywords for matching against second keywords detected in a particular received audio stream for use in identifying that the particular received audio stream should be played back to the user of the radio device accompanying an audio alert when a match is found;

detecting, by the radio device, a change in contextual parameters associated with the radio device and responsive to detecting the change in contextual parameters associated with the radio device, automatically updating the received audio stream playback alert keyword database based on the detected change in contextual parameters associated with the radio device to include one of an additional first keyword not previously included in the one or more first keywords and a modified first keyword of the one or more first keywords;

subsequently receiving, at the radio device via radio communications, a first particular received audio stream for playback to the user;

detecting, by the radio device, a match between a particular second keyword in the first particular received audio stream and one of the additional first keyword in the received audio stream playback alert database and the modified first keyword in the received audio stream playback alert keyword database; and one of:

prior to subsequent playback of the first particular received audio stream to the user, causing, by the radio device, an alert to be provided for the first particular received audio stream and subsequently playing back, by the radio device, the first particular received audio stream to the user; and during playback, by the radio device, of the first particular received audio stream to the user, causing, by the radio device, an alert to be provided for the first particular received audio stream.

2. The method of claim 1, wherein the detected change in contextual parameters include one or more of the following:
   a detected change in the user of the radio device;
   a detected change in a role of the user of the radio device;
   a detected change in an assignment of the user of the radio device;
   a detected change in an equipment of the user of the radio device;
   a detected change in a group affiliation of the user of the radio device; and
   a detected change in an expertise of the user of the radio device.

3. The method of claim 1, wherein the one or more contextual parameters are dynamic and are updated in real time.

4. The method of claim 1, wherein causing the alert to be provided for the first particular received audio stream comprises modifying all or part of the first particular received audio stream to indicate its importance.

5. The method of claim 4, wherein modifying all or part of the first particular received audio stream to indicate its importance comprises one or more of the following:
   increasing a volume of all or part of the first particular received audio stream;
   applying a frequency shift to all or part of the first particular received audio stream; and
   adding one or more sound effects to the first particular received audio stream.

6. The method of claim 1, wherein causing the alert to be provided for the first particular received audio stream comprises modifying all or part of one or more other particular received audio streams for playback to the user to be substantially simultaneously played back along with the first particular received audio stream on the radio device.

7. The method of claim 6, wherein modifying all or part of the one or more other particular received audio streams includes one or more of the following:
   decreasing a volume of all or part of the one or more other particular received audio streams;
   applying a frequency shift to all or part of the one or more other particular received audio streams;
   distorting all or part of the one or more other particular received audio streams;
   filtering all or part of the one or more other particular received audio streams;
   shaping all or part of the one or more other particular received audio streams;
   levelling all or part of the one or more other particular received audio streams; and
   muting all or part of the one or more other particular received audio streams.

8. The method of claim 1, wherein causing the alert to be provided for the first particular received audio stream comprises providing one or more of the following on the radio device, or an associated device, prior to subsequent playback of the first particular received audio stream or during playback of the first particular received audio stream:
   additional audio effects to indicate the importance of the first particular received audio stream;
   visual feedback to indicate the importance of the first particular received audio stream; and
   haptic feedback to indicate the importance of the first particular received audio stream.

9. The method of claim 1, further comprising:
   subsequently receiving, at the radio device via radio communications, a second particular received audio stream for playback to the user;
   detecting, by the radio device, a lack of a match between a particular third keyword in the second particular received audio stream and one of the additional first keyword in the received audio stream playback alert keyword database and the modified first keyword in the received audio stream playback alert keyword database; and
   playing back, by the radio device, the second particular received audio stream to the user without any alerts provided for the second particular received audio stream prior to or during the playing back of the second particular received audio stream.

10. A system for providing alerts for playback of received radio communications, the system comprising:
    a radio receiver device to receive audio streams and playback the received audio stream to a user of the radio receiver device;
    a processor, in the radio receiver device; and
    a memory coupled to the processor, the memory comprising instruction code that, when executed by the processor, performs a set of functions comprising:
        maintaining a received audio stream playback alert keyword database of one or more first keywords for matching against second keywords detected in a particular received audio stream for use in identifying that the particular received audio stream should be played back to the user of the radio receiver device accompanying an audio alert when a match is found;
        detecting a change in contextual parameters associated with the radio receiver device and responsive to detecting the change in contextual parameters associated with the radio receiver device, automatically updating the received audio stream playback alert keyword database based on the detected change in contextual parameters associated with the radio receiver device to include one of an additional first keyword not previously included in the one or more first keywords and a modified first keyword of the one or more first keywords;
        subsequently receiving a first particular received audio stream for playback to the user;
        detecting a match between a particular second keyword in the first particular received audio stream and one of the additional first keyword in the received audio stream playback alert keyword database and the modified first keyword in the received audio stream playback alert keyword database; and
        one of:
            causing an alert to be provided for the first particular received audio stream at the radio receiver device to a user of the radio receiver device, prior to subsequent playback of the first particular received audio stream at the radio receiver device to a user of the radio receiver device; and
            causing an alert to be provided for the first particular received audio stream at the radio receiver device to a user of the radio receiver device during playback of the first particular received audio stream at the radio receiver device to a user of the radio receiver device.

11. The system of claim 10, wherein the detected change in contextual parameters include one or more of the following:
    a detected change in the user of the radio receiver;
    a detected change in a role of the user of the radio receiver;

a detected change in an assignment of the user of the radio receiver;

a detected change in an equipment of the user of the radio receiver;

a detected change in a group affiliation of the user of the radio receiver; and a detected change in an expertise of the user of the radio receiver.

12. The system of claim 10, wherein the one or more contextual parameters are dynamic and are updated in real time.

13. The system of claim 10, wherein the instruction code for causing the alert to be provided for the first particular received audio stream includes instruction code for modifying all or part of the first particular received audio stream to indicate its importance.

14. The system of claim 10, wherein the instruction code for causing the alert to be provided for the first particular received audio stream includes instruction code for modifying all or part of one or more other received audio streams to be substantially simultaneously played back to the user along with the first particular received audio stream on the radio receiver device.

15. The system of claim 10, wherein the instruction code for causing the alert to be provided for the first particular received audio stream includes instruction code for providing one or more of the following on the radio receiver device, or an associated device, before or during play of the first particular received audio stream:

additional audio effects to indicate the importance of the first particular received audio stream;

visual feedback to indicate the importance of the first particular received audio stream; and haptic feedback to indicate the importance of the first particular received audio stream.

16. The system of claim 10, the memory comprising further instruction code that, when executed by the processor, performs a further set of functions comprising:

reading a second particular received audio stream for playback to the user;

detecting a lack of a match between a particular third keyword in the second particular received audio stream and one of the additional first keyword in the received audio stream playback alert keyword database and the modified first keyword in the received audio stream playback alert keyword database; and cause the second particular received audio stream to be played back to the user without any alerts provided for the second particular received audio stream prior to or during the playing back of the second particular received audio stream.

* * * * *